US010664293B2

United States Patent
Azulai et al.

(10) Patent No.: US 10,664,293 B2
(45) Date of Patent: May 26, 2020

(54) CONTEXT ORIENTED TRANSLATION (71) Applicant: ENTIT Software LLC, Sunnyvale, CA (US)

(72) Inventors: Asaf Azulai, Yehud (IL); Ori Abramovsky, Yehud (IL); Ben David, Yehud (IL)

(73) Assignee: MICRO FOCUS LLC, Santa Clara, CA (US)

( * ) Notice: Subject to any disclaimer, the term of this patent is extended or adjusted under 35 U.S.C. 154(b) by 0 days.

(21) Appl. No.: 15/746,160

(22) PCT Filed: Jul. 29, 2015

(86) PCT No.: PCT/US2015/042617
§ 371 (c)(1),
(2) Date: Jan. 19, 2018

(87) PCT Pub. No.: WO2017/019056
PCT Pub. Date: Feb. 2, 2017

(65) Prior Publication Data
US 2018/0321959 A1    Nov. 8, 2018

(51) Int. Cl.
*G06F 9/451* (2018.01)
*G06N 20/00* (2019.01)
(Continued)

(52) U.S. Cl.
CPC .......... *G06F 9/454* (2018.02); *G06F 3/0482* (2013.01); *G06F 40/47* (2020.01); *G06N 20/00* (2019.01)

(58) Field of Classification Search
CPC .... G06F 9/454; G06F 3/0482; G06F 17/2836; G06F 17/20; G06F 17/28; G06F 17/2818;
(Continued)

(56) References Cited

U.S. PATENT DOCUMENTS 7,496,496 B2    2/2009   Quirk et al.
7,536,640 B2    5/2009   Zhang et al.
(Continued)

FOREIGN PATENT DOCUMENTS

EP          2642385          9/2013

OTHER PUBLICATIONS

International Search Report and Written Opinion dated Apr. 26, 2016, PCT Patent Appln No. PCT/US2015/042617 dated Jul. 29, 2015, Korean Intellectual Property Office, 12 pgs.
(Continued)

*Primary Examiner* — Andrew C Flanders (57) ABSTRACT

An example non-transitory computer-readable medium to store machine-readable instructions that when accessed and executed by a processing resource cause a computing device to perform operations is described herein. The operations include connecting a first properties file with a corresponding application. The first properties file includes a plurality of text entries and associated location indicators. Text in the application is identified that is to be translated. The text to be translated corresponds to at least some of the text entries in the first properties file. The identified text is presented in the application, which provides context for the translation. The translation is received and a second properties file that includes the translation of the identified text and an associated location indicator is generated.

18 Claims, 10 Drawing Sheets

(51) Int. Cl.
*G06F 40/47* (2020.01)
*G06F 3/0482* (2013.01)

(58) Field of Classification Search
CPC .............. G06F 17/2827; G06F 17/2854; G06F 17/2875; G06F 17/2881; G06F 17/289; G06N 20/00
See application file for complete search history.

(56) References Cited

U.S. PATENT DOCUMENTS

| | | | | |
|---|---|---|---|---|
| 7,636,656 | B1* | 12/2009 | Nieh | G06F 9/454 704/2 |
| 8,306,807 | B2 | 11/2012 | Van Guilder et al. | |
| 8,548,794 | B2 | 10/2013 | Koehn | |
| 8,731,901 | B2 | 5/2014 | Srihari et al. | |
| 8,732,577 | B2 | 5/2014 | Jellison, Jr. | |
| 8,825,469 | B1 | 9/2014 | Duddu et al. | |
| 2003/0126559 | A1* | 7/2003 | Fuhrmann | G06F 9/454 715/229 |
| 2006/0156278 | A1* | 7/2006 | Reager | G06F 9/454 717/104 |
| 2006/0174196 | A1 | 8/2006 | Zhang et al. | |
| 2007/0226608 | A1* | 9/2007 | Virk | G06F 17/2247 715/234 |
| 2008/0275693 | A1 | 11/2008 | Chen et al. | |
| 2009/0327866 | A1 | 12/2009 | Li et al. | |
| 2010/0011354 | A1* | 1/2010 | Gharabally | G06F 9/453 717/178 |
| 2013/0253901 | A1* | 9/2013 | Krack | G06F 17/289 704/2 |
| 2015/0154159 | A1* | 6/2015 | Yin | G06F 9/454 715/234 |
| 2017/0131854 | A1 | 5/2017 | Abramovsky et al. | |

OTHER PUBLICATIONS

Tenni, J. et al., "Machine Learning of Language Translation Rules," (Research Paper), 7 pages.

Crowdin.com, "Localization Management Platform", Jun. 28, 2015, 6 pages. <https://web.archive.org/web/20150628001634/https://crowdin.com/>.

POEditor, "Software Localization Management Platform", Jul. 29, 2015, 8 pages. <https://web.archive.org/web/20150729051406/https://poeditor.com/>.

* cited by examiner

CONTEXT ORIENTED TRANSLATION

BACKGROUND

As businesses become more global, their web applications need to be available in different languages. Generally, the web application is written in one language and one or more translators are employed to translate text in the web application into other languages. In many cases, the translator only sees the text without seeing the context of the text in the web application. This can create a problem for certain languages (e.g., Chinese) where the context is important for proper translation. As a result, some of the text might be translated incorrectly, or even missed. In these situations, the developer of the web application becomes involved in the translation, making the process more cumbersome.

DETAILED DESCRIPTION

A context oriented translation tool can provide context for text within an application to facilitate translation of the text into another language. An example context oriented translation system can include a non-transitory memory to store machine-readable instructions and a processing resource (e.g., one or more processor cores) to execute the machine-readable instructions. A first properties file, which includes text and associated location indicators, can be connected with its corresponding application (e.g., via a location resource indicator). Text in the application that is to be translated can be identified (e.g., graphically or otherwise distinguished) within a display of the application to provide context for the text that is to be translated. A translation can be received and a second properties file, which includes a translation of the identified text and its associated location indicator, can be generated.

Figure 1:
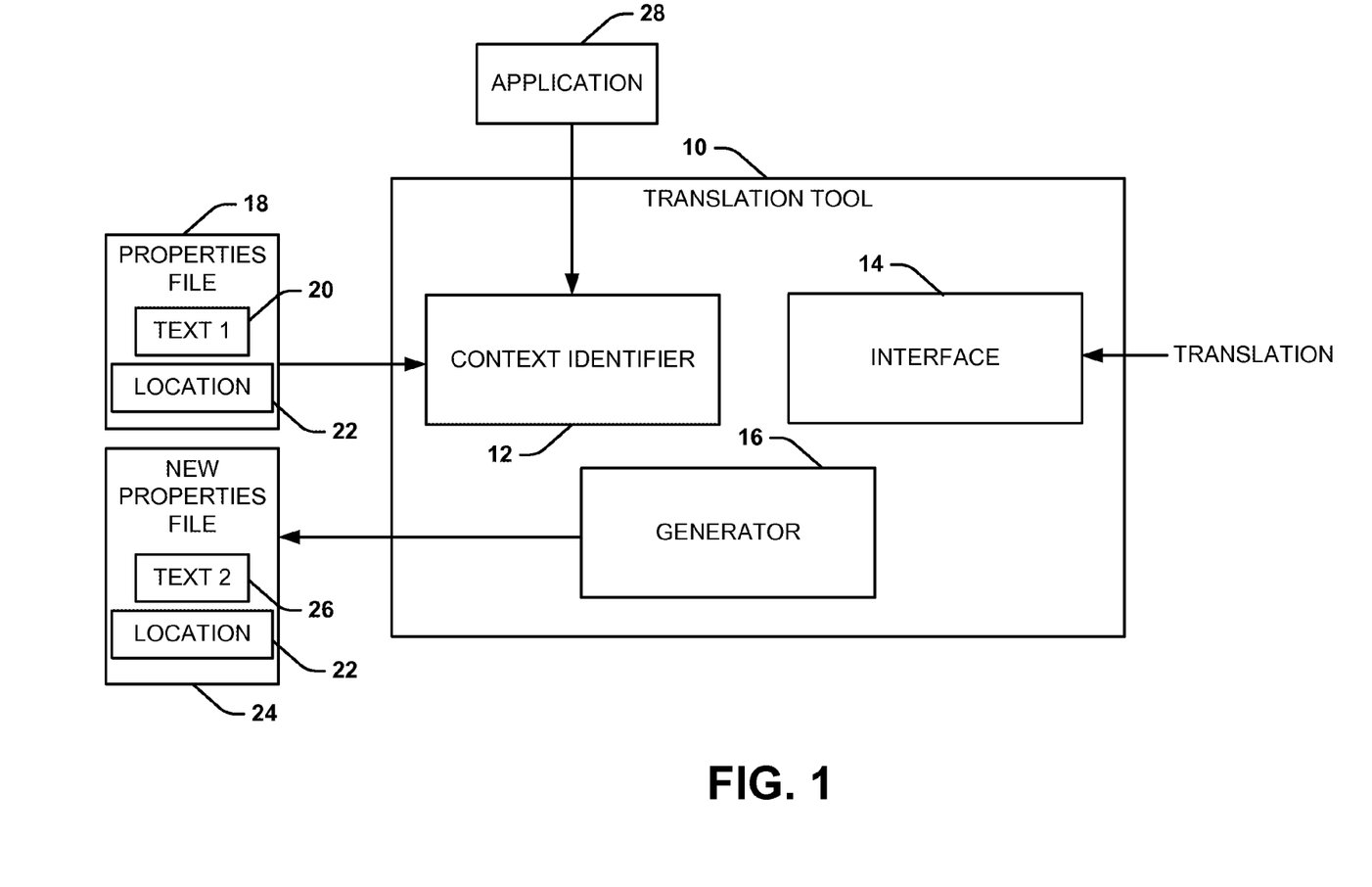
FIG. 1 illustrates an example of a translation tool that can facilitate a context oriented translation.

FIG. 1 illustrates an example of a translation tool 10 that can facilitate a context oriented translation of text in an application 28 (e.g., a web application) into another language. For example, the context oriented translation may involve display the text 20 in the application 28 as to provide context about the use of the text 20. Providing the context about the use can increase the accuracy of the translation, while reducing the requirement for developer involvement with the translation. The translation tool 10 enables a translator to navigate through an application 28 while presenting translatable properties presented in context within the application 28. This eliminates the need for translators to translate the text 20 in the properties file 18 without the benefit of seeing the context of the text. The translation tool 10, in some examples, can provide navigation through different pages of the application 28, to ensure that all text, including edge cases of the application, are translated.

The translation tool 10 can include a context identifier 12 that can connect text entries (or text 20) from the properties file 18 with the corresponding text in the application 28. In some examples, the context identifier 12 can provide a browser plug-in that can load the application 28 in a language of a properties file 18 to provide context for the translation of the text entries (or "text") 20 of the properties file 18. In other examples, the context identifier 12 can load the application 28 in the language of the properties file 18 (e.g., in a wizard) to provide corresponding context for the translation of the text in the properties file 18. The application 28, in some examples, can be accessed from a remote location, while in other examples, the application 28 can be accessed locally. Similarly, the properties file 18 can be stored locally in some examples, but also can be stored remotely with the application 28 in other examples.

The properties file 18 includes the text 20 for the application 28. Accordingly, the properties file 18 includes text 20 in a first language and corresponding location indicators 22 corresponding to the display of the application 28. In some examples, the properties file 18 may include additional text, tags, or other indications that are added by the developer to guide the context identifier 12 in identifying which text in the application matches is to be translated or is not to be translated. That is, a developer can tag text to specify whether or not selected text is to be translated or not translated.

By way of example, the context identifier 12 can parse the application 28 to find all text that needs to be translated. The context identifier 12 may identify text in the application 28 that is to be translated using the properties file 18 and the application 28. In some examples, the context identifier 12 may utilize the additional text, tags or other indicated by the developer for guidance in the identification. In still other examples, the context identifier 12 may identify the text that is to be translated based on a machine learning algorithm. The machine learning algorithm can, for example, determine whether text in the application 28 is static (e.g., showing up with the same text in the application 28 in different scenarios, text, buttons, labels, etc.) or dynamically changing (e.g., different text values showing up in the application 28 in various scenarios, like a calculated value, a form) to determine whether certain portions of the text should be translated. In this example, the machine learning algorithm can determine that static text should be translated, while dynamic text, which changes during execution and use of the application, should not be translated. The determination of static text or dynamic text can be based on historical translations or user specified tags.

As another example, the machine learning algorithm can determine whether the text is tagged or otherwise identified by the developer as translate/do not translate (e.g., historically or in the current properties file 18 or the application 28). In this case, the context identifier 12 can allow the translator to translate text tagged to be translated and skip or otherwise not allow the translator to translate the text tagged not to be translated. The tags can serve as a hint to the context identifier 12 that some text is not to be translated.

For example, if two different buttons match a particular location indicator and one of the buttons is tagged as not to be translated, the context identifier 12 would know to do nothing with the tagged button and to translate the untagged button.

The context identifier 12 can send the identified text in the application 28 to the interface 14, which can present the text to the translator in the context of the application 28 for translation. In some instances, the interface 14 may be a user interface with a display and an input device. In other instances, the interface 14 may be an interface that exposes the text and its associated context to an automated machine translator (e.g., machine readable instructions that execute to translate the text). In either instance, the interface 14 may present the identified text in the application 28 for translation. At least the portion of the application 28 surrounding the identified text can provide a context for the identified text to enable context-oriented translation of the identified text. The interface 14 can receive a translation of the identified text. In some examples, the interface 14 may display the translation in the context and wait for verification that the translation is correct. In some examples, a translator can verify that the translation (provided by the translator a human or machine translator) is correct.

When the translation is received, a new properties file 24 can be generated by the generator 16. In some examples, this generation of the new properties file 24 can be put on hold until the verification is received. The new properties file 24 can include the translated text 26 and associated location indicators 22 (which can be the same as the location indicators in the original properties file 18). In other examples, the new properties file 24 can include the translated text 26 without the location indicators. There can be any number of new properties files to accommodate a set of languages in which the application may be used.

In some examples, the new properties file 24 can be grouped with or be part of the same properties file 18 that is being translated (e.g., it may be appended to the same file, stored in the same folder, etc.). For example, the new properties file 24 may be used in place of the properties file 18 when a user accesses the application 28 from a certain location (e.g., based on IP address or other location information for the user) and/or based on a language preference that matches the language of the generated properties file. Accordingly, both the properties file 18 and the new properties file 24 can be connected to (e.g., associated with) the application 28.

Figure 2:
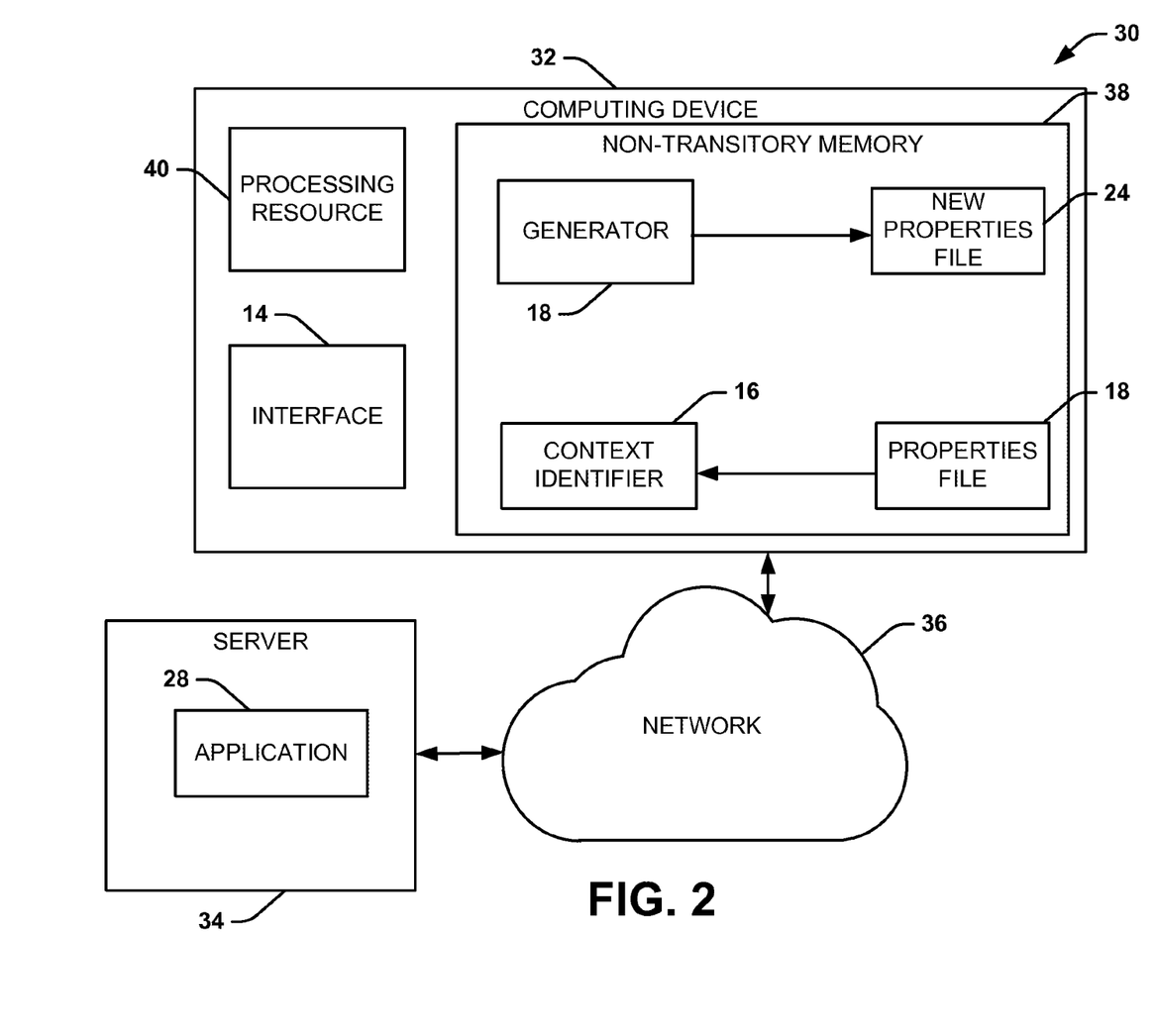
FIG. 2 illustrates an example of a context oriented translation system.

As a further example, the translation tool 10 may be part of a context oriented translation system 30. The context oriented translation system 30 can include a computing device 32 and a remote server 34 connected to a network 36. The translation tool 10 can be embodied on the computing device 32 and the application 28 can be stored on the remote server 34 and accessible over the network 36. The network 36 can be any type of network that enables communication between the computing device 32 and the remote server 34. For example, the network 36 can be a wide area network, a local area network, or the like.

The computing device 32 may be one or more devices that include at least a non-transitory memory 38, a processing resource 40, and the interface 14. The non-transitory memory 38 may store machine-readable instructions, including at least a portion of the context identifier 12 and the generator 16 of the translation tool 10, system data, including the properties file 18 and the new properties file 24. Examples of the non-transitory memory 38 can include one or more volatile memory (e.g., RAM), nonvolatile memory (e.g., a hard disk, a flash memory, a solid state drive, or the like), or a combination of both. The processing resource 40 (e.g., one or more processing cores) may access the non-transitory memory 38 and execute the machine-readable instructions to implement functions of the translation tool 10 (e.g., facilitating translation of a portion of the properties file 18 using the context of the application 28). The interface 14 can facilitate the context oriented translation. In some examples, the interface 14 can be a user interface that may include a user input device (e.g., keyboard, mouse, microphone, etc.) and/or a display device (e.g., a monitor, a screen, a graphical user interface, speakers, etc.).

The remote server 34 can provide the application 28 associated with the properties file 18 to the computing device 32 for the context oriented translation. The remote server 34 can include one or more devices that can store the application 28. For example, the remote server 34 may include a non-transitory memory that stores the application 28. In some examples, the application 28 can be a web application executable by a program on the computing device 32. In this example, the computing device 32 can access the application 28 stored by the remote server 34 via a link or other means of access.

FIGS. 3-7 provide an example workflow demonstrating translation of an English properties file 42 (an example of properties file 18) to a Hebrew properties file 62 (an example of properties file 24). The translation from English to Hebrew is just provided as an example. The original properties file need not be in English and the translation need not be exclusively to Hebrew. As an example, additional translations may be made, in which the English properties file 42 is translated to other languages, such as Chinese, Japanese, Vietnamese, Russian, Spanish, French, German, Dutch, etc., in a similar manner.

Figure 3:
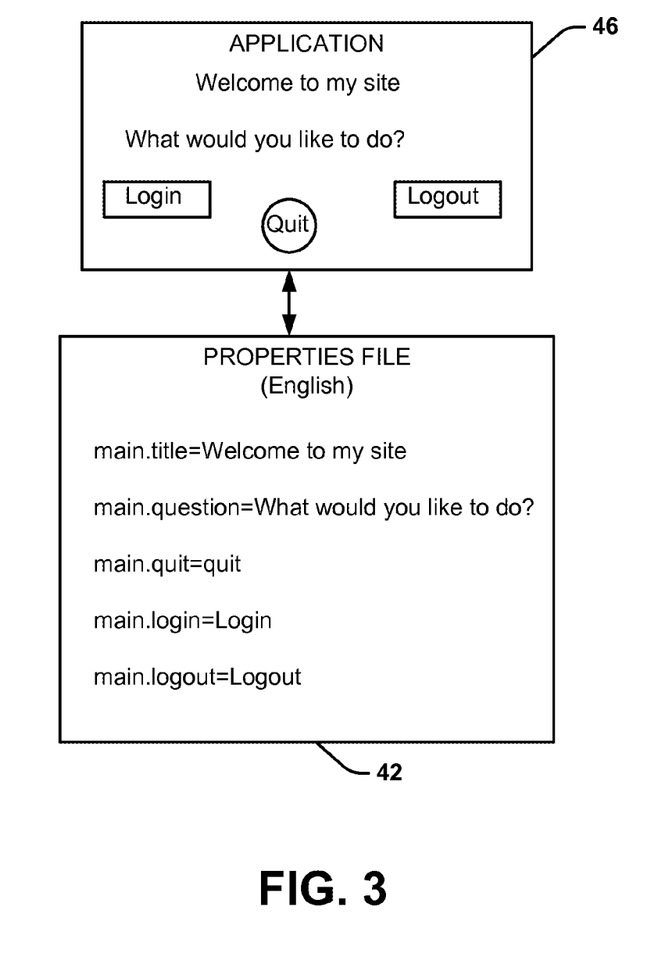
FIG. 3 illustrates an example of a properties file and corresponding display of an application.

FIG. 3 illustrates an example of a properties file 42 in English and a corresponding display of an application 46 (an example of a display of application 28) in English. In this example, the text within the properties file 42 can include, "Welcome to my site", "What would you like to do?", "quit", "Login", and "Logout". The accompanying location indicators in the properties file 42 can include, respectively, "main.title", "main.question", "main.quit", "main.login", and "main.logout". The example display of the corresponding application 46 shows how the different text entries are used in the application.

Figure 4:
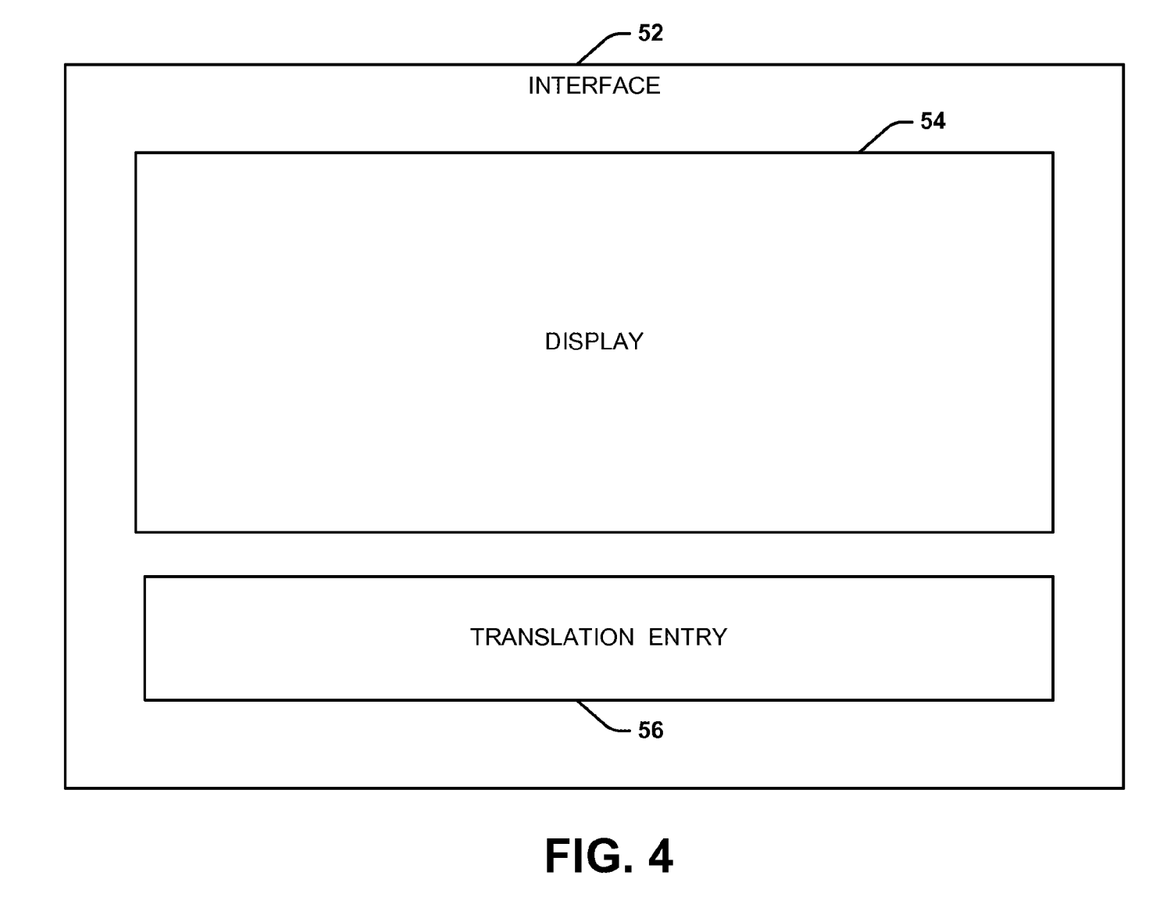
FIG. 4 illustrates an example of an interface that can facilitate the context oriented translation.

An example interface 52 that can be used for the translation is shown in FIG. 4. While this example shows a user interface, another type of interface that can facilitate machine translation can also be used. In this example, the interface 52 may include a display 54 and an area that can facilitate entry of the translation 56. The display 54 may allow display of at least a portion of the application with the text to be translated to provide context. The area (e.g., an overlay or pop-up widow), which enables entry of the translation 56, may allow text entry (e.g., via keyboard), graphical entry (e.g., graphical election of text), spoken entry (e.g., voice transcription), or the like. The entry of the translation 56 may be aided by the context afforded by presenting the to-be-translated text in its actual context of the application.

Figure 5:
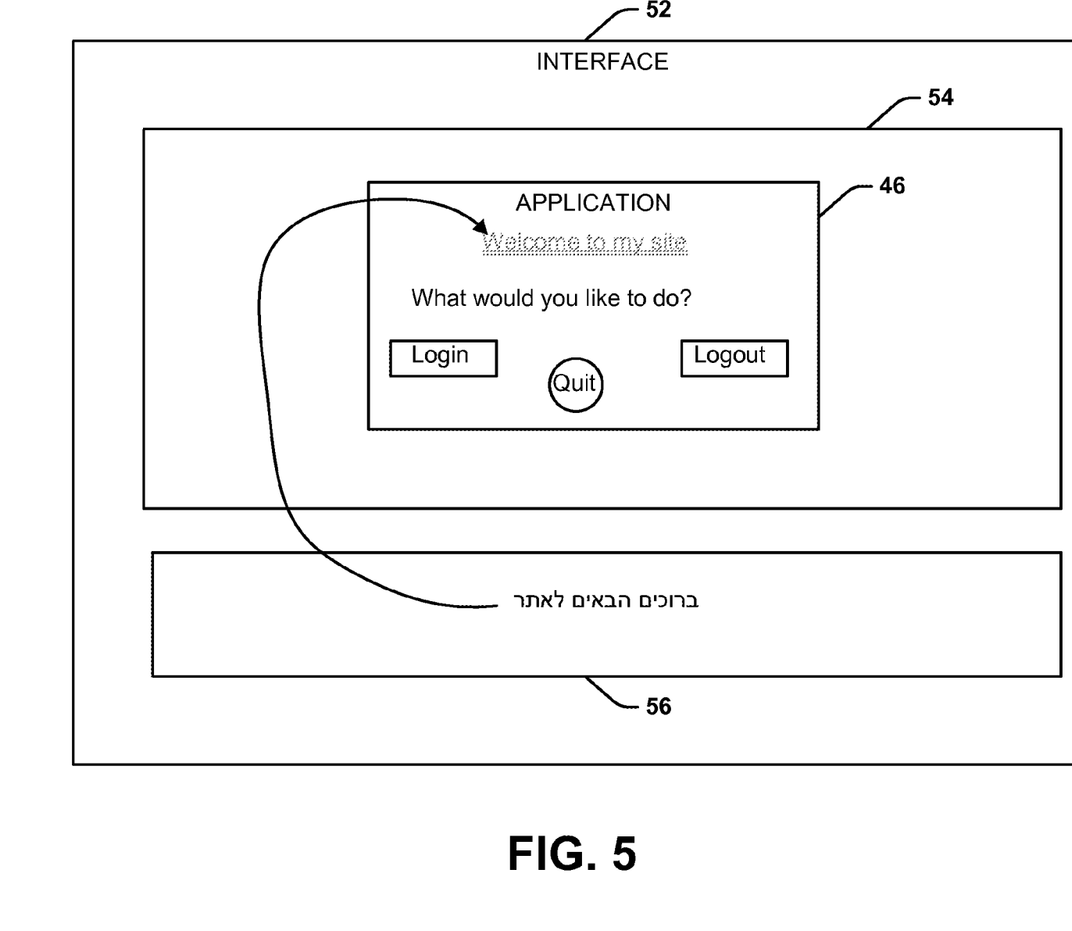
FIG. 5 illustrates an example of the interface being used for the context oriented translation.
Figure 6:
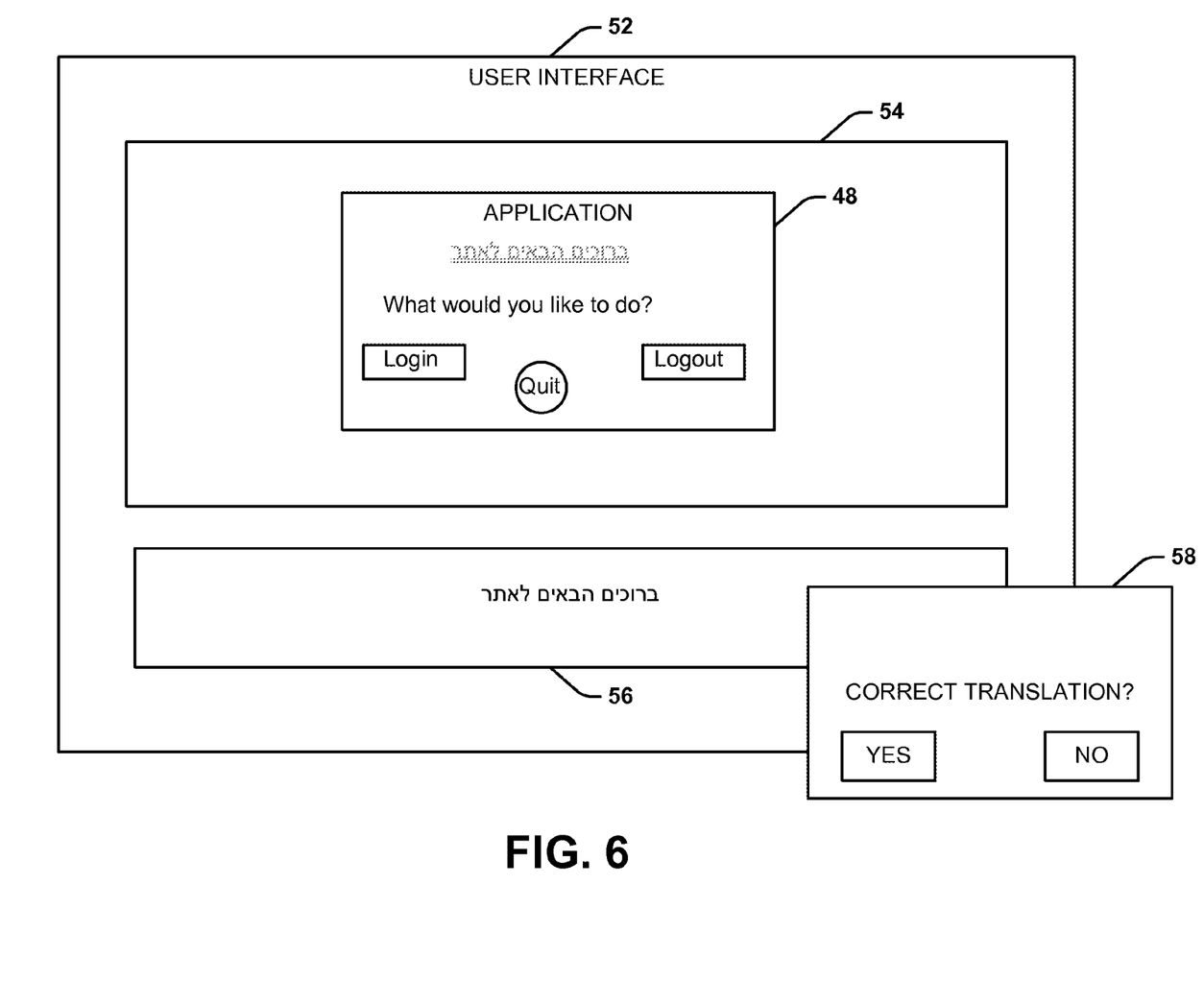
FIG. 6 illustrates an example of the interface being used for verification of the context oriented translation.

FIGS. 5 and 6 show an example using the interface 52 to complete the translation of application 46 of FIG. 3 from English into Hebrew. Indeed, the interface 52 can display the application with the identified text from the properties file, receive the translation, and allow the translator to review the translation in the application itself before outputting the new properties file based on the translation. In some examples, the interface 52 may take the form of a wizard (or a graphical user interface element that provides a help feature to automate the translation processes) to simplify the translation for the translator. For example, the interface 52 can display at least a portion of the identified text with at least a portion of the application, receiving the associated translated text, and displaying the translated text in the application.

Within the display 54 of FIG. 5, the text to be translated (e.g., Welcome to my site) can be identified and its graphical display differentiated or modulated from the rest of the text in the application. As shown in FIG. 5, a graphical identification (e.g., the color of the text to be translated can be changed and the text to be translated can be underlined) can be modulated within the application. However, in other examples, the text to be translated can be highlighted or otherwise identified within the application. The translator can enter a translation of the text to be translated into the area that can facilitate entry of the translation 56.

In FIG. 6, the text to be translated can be replaced with the translated text in the application 48 as displayed in the display 54. The translated text may remain graphically distinguished until verified and/or approved by the user as a correct translation in light of the context. For example, a pop-up 58 or other user interface element can be generated asking for verification of the translation. If the translation is verified (in response to a user input) as correct in light of the context (e.g. in response to a user input (e.g., with a click of "yes")), the graphical distinguishing feature can be changed, the new properties file can be updated, and the translation can proceed to the next feature to translate (e.g., "What would you like to do?"). In other examples, the graphical distinguishing feature can remain regardless of whether a translation has been verified. If the translation is not approved, or not verified, (e.g., with a click of "no"), the area that can facilitate entry of the translation 56 can be cleared and the original text to be translated can replace the translated text, in preparation for entry of a new translation. The translation shown in FIGS. 5 and 6 can proceed until all of the text in the application (or all of the text that is indicated as to be translated) is translated.

Figure 7:
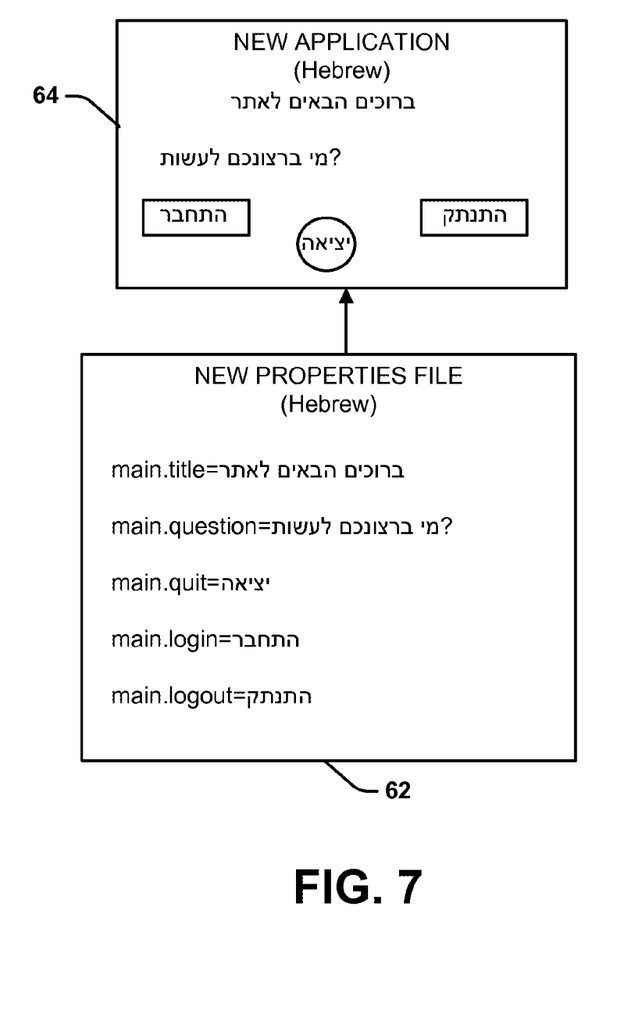
FIG. 7 illustrates an example of a new properties file after translation and a corresponding translated display of the application.

FIG. 7 illustrates an example of the new properties file 62 in Hebrew after the translation and a corresponding translated display of the application 64 in Hebrew. Like the properties file 42, the new properties file 62 can include text and associated location indicators. While the location indicators remain the same between the properties files 42, 62, while the text is translated into Hebrew in the new properties file 62. Indeed, while the location indicators still include, "main.title", "main.question", "main.quit", "main.login", and "main.logout", the translations "Welcome to my site", "What would you like to do?", "quit", "Login", and "Logout" includes "ברוכים הבאים לאתר", "לעשות התנתק", "התחבר", "יציאה", and "מי ברצונכם?", respectively. An example of the corresponding application 64 shows how the different text entries, translated in Hebrew, are used in the application.

Figure 8:
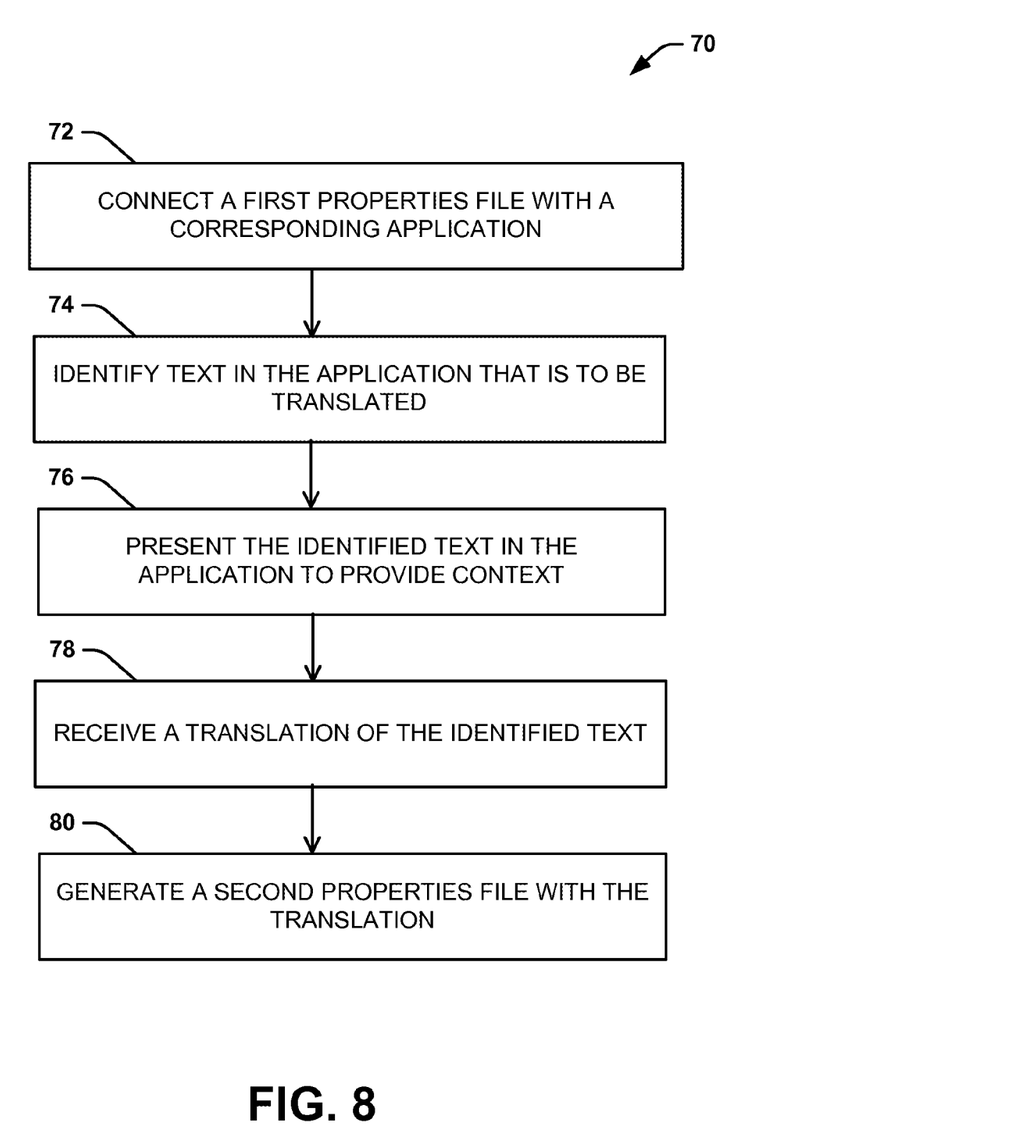
FIG. 8 illustrates a flowchart of an example method for context oriented translation.
Figure 9:
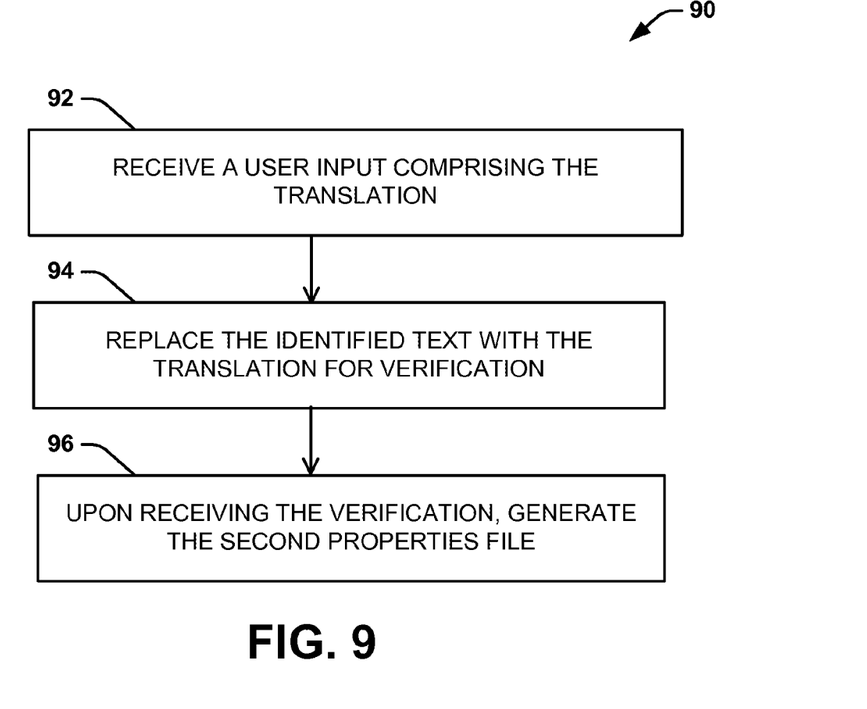
FIG. 9 illustrates a flowchart of an example method for checking the validity a translation in light of the context.

In view of the foregoing structural and functional features described above, example methods will be better appreciated with reference to FIGS. 8-9. While, for the purposes of simplicity of explanation, the example methods of FIGS. 8-9 are shown and described as executing serially, the present examples are not limited by the illustrated order, as some actions could in other examples occur in different orders and/or concurrently from that shown and described herein. Moreover, it is not necessary that all described actions be performed to implement a method. The method can be stored in one or more non-transitory computer-readable media and executed by one or more processing resources, such as disclosed herein.

FIG. 8 illustrates a flowchart of an example method 70 for context oriented translation. For example, the method 70 can be executed by a system (e.g., context oriented translation system 30) that can include a non-transitory memory (e.g., non-transitory memory 38) that stores machine executable instructions and a processing resource (e.g., processing resource 40) to access the non-transitory memory and execute the instructions to cause a computing device to perform the acts of method 60. The method 70 can parse an application to find all text that needs to be translated in the application based on an associated properties file and enable translation/review of the text that needs to be translated/the translation together with the context of the application. For example, the method 70 can ensure that the translator is aware of how each of the text values to be tranlated are used within the context of the application, increasing the accuracy of the translation, while reducing the requirement for developer involvement with the translation, and ensuring that all edge cases are translated.

At 72, a first properties file (e.g., properties file 18) can be connected with a corresponding application (e.g., by context identifier 12). The connection can include any text, tags, or other indications from the properties file in with the application, for example. At 74, text in the application that is to be translated can be identified (e.g., by context identifier 12). For example, the text that is to be translated can be identified based on a machine learning algorithm. The machine learning algorithm can, for example, determine whether text in the application is static (e.g., showing up with the same text in the application in different scenarios, text, buttons, labels, etc.) or dynamically changing (e.g., different text values showing up in the application in various scenarios, like a calculated value, a form) to provide a guide as to whether certain portions of the text should be translated. In this example, the machine learning algorithm can determine that static text should be translated, while dynamic text should not be translated. The determination of static text or dynamic text can be based on historical translations. As another example, the machine learning algorithm or another automated process implemented as part of the method 70 can determine whether the text is tagged or otherwise identified by the developer as translate/do not translate (e.g., historically or in the current properties file or application).

At 76, the identified text in the application can be presented (e.g., from the context identifier 12 to the interface 14) to provide context for the translation. The identified text may present the identified text in the application to a user for translation. At least the portion of the application surrounding the identified text can provide a context for the identified text to facilitate the translation of the identified text in its intended context. At 78, the translation of the identified text can be received (e.g., by generator 16), and at 80, a second properties file (e.g., new properties file 24) with the translation can be generated (e.g., by generator 16). In some examples, the translation can be displayed in the context and wait for verification, by the translator, that the translation is correct. The second properties file can be grouped with the first properties file so that the second properties file may be used in place of the first properties file when a user accesses the application from a certain location (e.g., based on IP address) and/or with a certain set language preference.

FIG. 9 illustrates a flowchart of an example method 90 for checking the validity a translation in light of the context. For example, the method 90 can be executed by a system (e.g., context oriented translation system 30) that can include a non-transitory memory (e.g., non-transitory memory 38) that stores machine executable instructions and a processing resource (e.g., processing resource 40) to access the memory and execute the instructions to cause a computing device to perform the acts of method 90. The method 90 can enable a translator (e.g., a user or automated machine translator) to navigate in an application using an interface that presents translatable properties as they are used in context within the application, rather than having to translate the text code in the properties file with no context. In some examples, feedback related to the validity of the translation can be given according to the illustration of the interface 52 of FIGS. 5 and 8.

At 92, a user input comprising the translation can be received (e.g., in the area that can facilitate entry of the translation 56 of interface 52. The user input can be based on the text to be translated being graphically differentiated or modulated (e.g., highlighted, color changed, underlined, etc) from the rest of the application. At 94, the identified text can be replaced in the application with the translated text for verification (e.g., in display 54 of interface 52). The translated text within the application can remain graphically differentiated or modulated until it is verified as correct. In other examples, the text within the application, while the tool is being implemented, can remain differentiated regardless of the At 96, upon receiving the verification (e.g., presented in pop-up 58), the second properties file can be generated. For example, the second properties file can include the translated text. The second properties file can be updated as additional text is translated.

In some examples, the methods 70 and/or 90 may take place using a wizard (or a user interface element that provides a help feature to automates the translation processes) to simplify the translation for the translator. For example, the user interface can display at least a portion of the identified text with at least a portion of the application, receiving the associated translated text, and displaying the translated text in the application. A wizard can thus step through each text field that is to be translated to ensure that all necessary text is translated including all edge cases.

Figure 10:
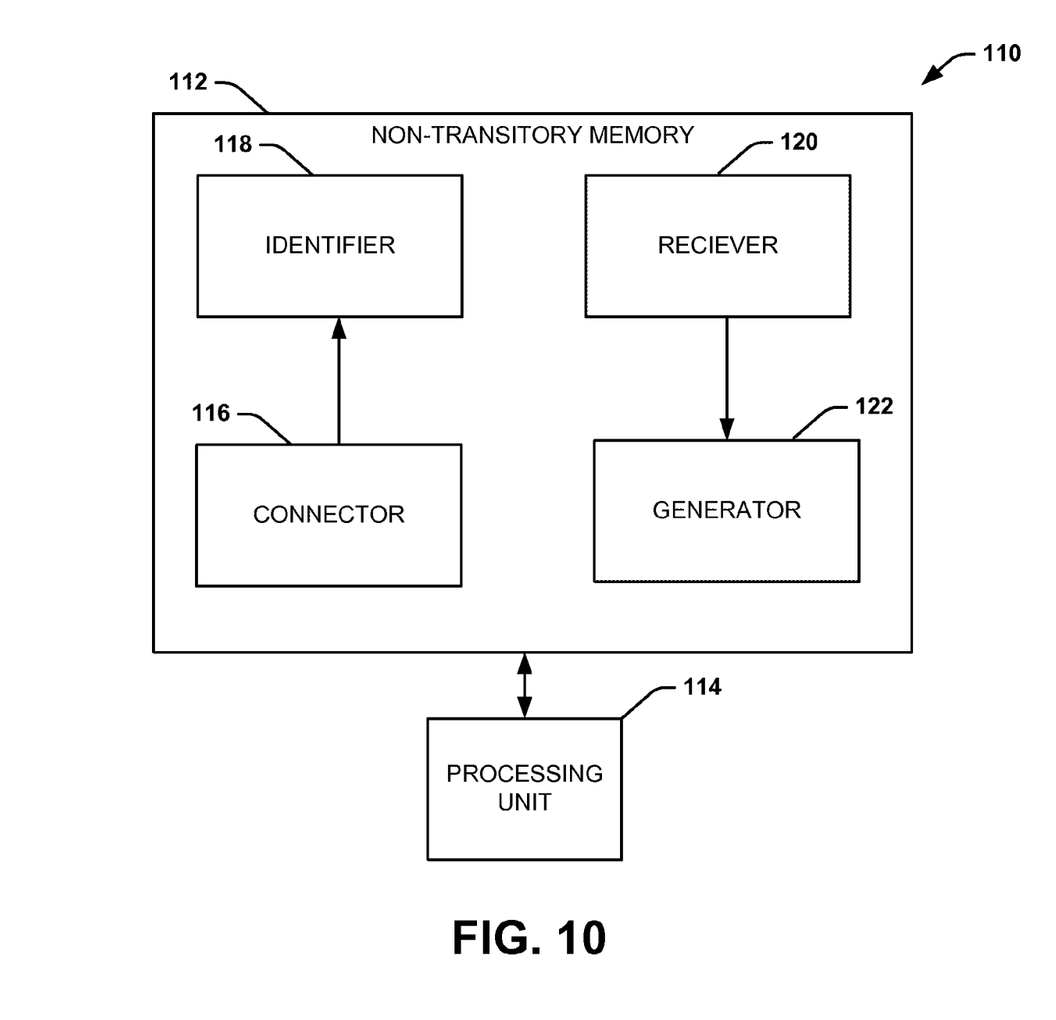
FIG. 10 illustrates another example of a context oriented translation system.

FIG. 10 illustrates an example of a context oriented translation system 110. The context oriented translation system 110 may comprise a non-transitory memory 112 to store machine-readable instructions. The context oriented translation system 110 may also comprise a processing unit 114 to access the non-transitory memory 112 and execute the machine-readable instructions. The machine-readable instructions may comprise a connector 116 to connect a first properties file with a corresponding application file. The first properties file may comprise a plurality of text entries and an associated location indicator for each of the plurality of text entries. The machine-readable instructions may also comprise an identifier 118 to identify text in the application that is to be translated. The identified text in the application may correspond to at least some of the plurality of text entries in the first properties file. The connector 116 may present the identified text in the application to provide context for the identified text that is to be translated. The machine-readable instructions may also comprise a receiver 120 to receive a translation of the identified text. The machine-readable instructions may also comprise a generator 122 to generate a second properties file comprising the translation of the identified text and an associated location indicator.

What have been described above are examples. It is, of course, not possible to describe every conceivable combination of components or methods, but one of ordinary skill in the art will recognize that many further combinations and permutations are possible. Accordingly, the disclosure is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. A non-transitory computer-readable medium to store machine-readable instructions that, when accessed and executed by a processing resource, cause the processing resource to:
   connect a first properties file with a corresponding application, the first properties file comprising a plurality of text entries and an associated location indicator for each of the plurality of text entries;
   identify text to be translated in the application, wherein the identified text in the application corresponds to at least some of the plurality of text entries in the first properties file;
   cause an interface for a translation tool to be displayed, the interface comprising a first area to display the application and a second area to receive a translation of the identified text in the application;
   cause to be presented in the first area of the interface a portion of the application that includes the identified text to be translated to provide context for the identified text that is to be translated;
   receive a translation of the identified text in the second area of the interface while the presented portion of the application that includes the identified text is displayed in the first area of the interface; and
   generate a second properties file comprising the translation of the identified text and an associated location indicator.

2. The non-transitory computer-readable medium of claim 1, wherein the instructions further cause the processing resource to modulate a graphical display of the application to provide the context for the identified text.

3. The non-transitory computer-readable medium of claim 2, wherein the instructions further cause the processing resource to change a graphical identification of the identified text in the application within the application.

4. The non-transitory computer-readable medium of claim 3, wherein the instructions further cause the processing resource to highlight the identified text in the application within the application.

5. The non-transitory computer-readable medium of claim 1, wherein the instructions further cause the processing resource to replace the identified text in the application with the translation of the identified text.

6. The non-transitory computer-readable medium of claim 5, wherein the instructions further cause the processing resource to verify that the translation of the identified text is correct based on the context provided by the application.

7. The non-transitory computer-readable medium of claim 1, wherein the instructions further cause the processing resource to identify text in the application that is to be translated based on a machine learning algorithm.

8. The non-transitory computer-readable medium of claim 1, wherein the instructions further cause the processing resource to connect the second properties file to the application.

9. The non-transitory computer-readable medium of claim 1, wherein the instructions further cause the processing resource to provide a user interface element to receive the translation in response to a user input.

10. A method comprising:
connecting, by a system comprising a processing resource, a first properties file with a corresponding application, the first properties file comprising a plurality of text entries and an associated location indicator for each of the plurality of text entries;
identifying, by the system, text to be translated in the application, wherein the identified text in the application corresponds to at least some of the plurality of text entries in the first properties file;
causing, by the system, an interface for a translation tool to be displayed, the interface comprising a first area to display the application and a second area to receive a translation of the identified text in the application;
causing, by the system in the first area of the interface, a portion of the application that includes the identified text to be translated to be presented to provide context for the identified text that is to be translated;
receiving, by the system, an input comprising a translation of the identified text in the second area of the interface while the presented portion of the application that includes the identified text is displayed in the first area of the interface;
replacing, by the system, the identified text in the application with the translation; and
generating, by the system, a second properties file comprising the translation of the identified text and an associated location indicator.

11. The method of claim 10, wherein the identifying is based on a machine learning algorithm.

12. The method of claim 10, further comprising providing a user interface element to present the identified text in the application and to receive the translation in response to a user input.

13. The method of claim 12, wherein the user interface element displays the application with the translation replacing the identified text.

14. The method of claim 10, wherein the identifying is based on an indication comprising metadata indicating that the portion of the text in a given language is at least one of to be translated or is not to be translated.

15. A system comprising:
a non-transitory memory to store machine-readable instructions; and
a processing resource to access the memory and execute the machine-readable instructions, the machine-readable instructions to cause the processing resource to:
connect a first properties file with a corresponding application, the first properties file comprising a plurality of text entries and an associated location indicator for each of the plurality of text entries, and to identify text to be translated in the application, wherein the identified text in the application corresponds to at least some of the plurality of text entries in the first properties file;
cause an interface for a translation tool to be displayed, the interface comprising a first area to display the application and a second area to receive a translation of the identified text in the application;
cause, in the first area of the interface, a portion of the application that includes the identified text to be translated to be presented to provide context for the identified text that is to be translated and cause an input comprising a translation of the identified text to be received; and
replace the identified text in the application with the translation for a verification and upon receiving the verification, generate a second properties file comprising the translation and the associated location indicator.

16. The non-transitory computer-readable medium of claim 1, wherein, responsive to receipt of the translation of the identified text in the second area of the interface, the instructions further cause the processing resource to:
cause the received translation of the identified text to be displayed in the portion of the application presented in the first area of the interface; and
receive a verification that the received translation of the identified text is correct.

17. The method of claim 10, further comprising:
causing the received translation of the identified text to be displayed in the portion of the application presented in the first area of the interface;
receiving a verification that the received translation of the identified text is correct; and
responsive to receipt of the verification, replacing the identified text in the application with the translation.

18. The system of claim 15, wherein the machine-readable instructions cause the processing resource to:
cause the translation of the identified text to be displayed in the portion of the application presented in the first area of the interface.

* * * * *